United States Patent [19] [11] 3,800,243
Wrobel et al. [45] Mar. 26, 1974

[54] DIODE LASER
[75] Inventors: Joseph S. Wrobel, Garland; Robert Thomas Bate, Richardson, both of Tex.
[73] Assignee: Texas Instruments Incorporated, Dallas, Tex.
[22] Filed: July 19, 1971
[21] Appl. No.: 163,819

[52] U.S. Cl. ................ 331/94.5, 317/235 AP
[51] Int. Cl. ............................ H01s 3/00
[58] Field of Search ......... 331/94.5 H; 317/235 AP

[56] References Cited
UNITED STATES PATENTS
| | | | |
|---|---|---|---|
| 3,482,189 | 12/1969 | Fenner | 331/94.5 |
| 3,593,190 | 7/1971 | Reinberg | 331/94.5 |
| 3,579,142 | 5/1971 | Smiley | 331/94.5 |
| 3,624,553 | 11/1971 | Van-Tran | 331/94.5 |
| 3,059,117 | 10/1962 | Boyle et al. | 331/94.5 |

OTHER PUBLICATIONS
Woolley et al., "Some Properties of GeTe-PbTe Alloys" Jour. of the Electrochemical Soc., Jan. 1965, pp. 82–84.

Primary Examiner—Ronald L. Wibert
Attorney, Agent, or Firm—Harold Levine; Andrew M. Hassell; William E. Hiller

[57] ABSTRACT
A semiconductor diode laser has been fabricated from a lead-germanium telluride cyrstal. For example, a $Pb_{0.95}Ge_{0.05}Te$ diode has been found to exhibit peak emission at a wavelength of $4.45\mu$. Compositional tuning of the device enables the selection of any desired peak emission wavelength within the approximate range of 2 to $6\mu$, which is useful for the spectroscopic determination of atmospheric gases and/or pollutants, including particularly carbon monoxide, carbon dioxide and nitric oxide.

6 Claims, 7 Drawing Figures

Square Wave Operation

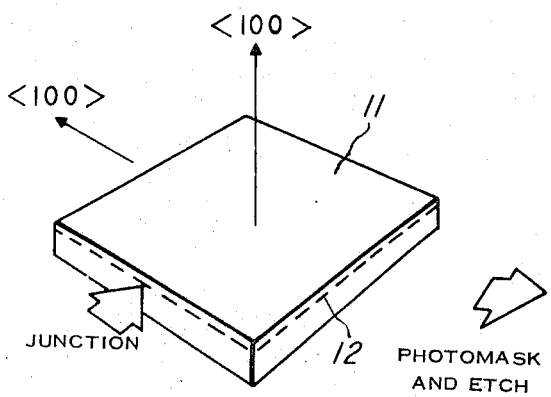
Fig. 1
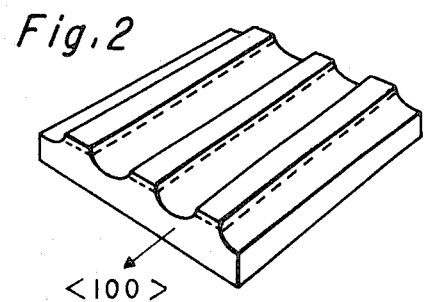
Fig. 2
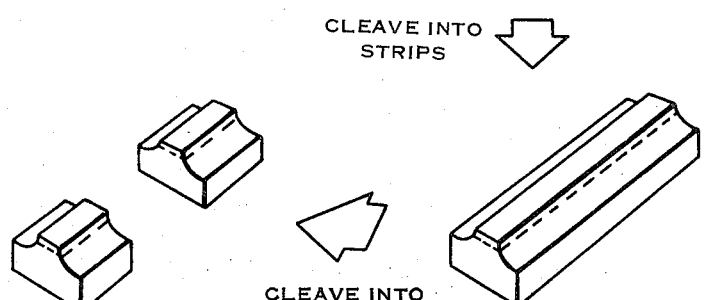
Fig. 4
Fig. 3
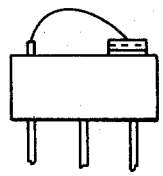
Fig. 5

Laser Line
(2 Amp Pulses, 300 pps
600 MA Threshold)

Square Wave Operation

DIODE LASER

This invention relates to the fabrication of semiconductor lasers, and more particularly to lead-germanium telluride as a semiconductor material for use in the fabrication of laser devices.

Infrared absorption spectroscopy is a classical method for the detection and quantitative determination of numerous gases and vapors. However, the instruments currently in use have resolutions that are inadequate for the analysis of certain typical gases, due to the narrow absorption linewidths of such gases, and the inherent limitations of the incoherent light sources used in standard instruments. The use of gas lasers as coherent light sources is seldom satisfactory, since these lasers cannot be tuned appreciably from their nominal wavelengths.

The use of certain semiconductor diode lasers in the design of infrared spectrometers has now been recognized as advantageous because they are "tunable" over a wide range of wavelengths, and because of their relative simplicity, efficiency, and small size.

Accordingly, it is an object of the present invention to provide a tunable semiconductor laser having superior operating characteristics, particularly for use in the 2 to 6$\mu$ region of the infrared spectrum.

It is a further object of the invention to provide a tunable semiconductor diode laser having a wide range of peak emission wavelengths, and the capability of operation at higher temperatures than prior semiconductor lasers of comparable emission wavelengths. Still further it is an object of the invention to provide a superior system for spectroscopic analysis of gases and vapors having infrared absorption lines in the 2 to 6 $\mu$ region.

One aspect of the invention is embodied in a semiconductor laser comprising lead-germanium telluride. In a preferred embodiment, the laser crystal includes a p-n junction which can be stimulated to emit coherently light by forward biasing. However, in other embodiments the crystal consists essentially of one conductivity type, and is stimulated or "pumped" by an electron beam, for example, or by a laser beam emitted from another device.

A semiconductor diode laser, as distinguished from semiconductor diodes generally, or as distinguished from incoherent light emitting semiconductor diodes, is shaped in the form of a Fabry-Perot optical cavity. That is, the semiconductor body is preferably shaped to provide parallel, optically flat surfaces on opposite sides of the p-n junction and perpendicular to at least a substantial portion of the junction. Such geometry is significant because the parallel opposite surfaces operate to reflect a sufficient portion of the spontaneous emission, within the plane of the junction, thereby stimulating the emission of coherent light. Other geometries are also capable of generating similar reflection patterns to enhance the lasing effect, including a prism-shaped cavity, and a cylindrical cavity, for example. The geometry of the crystal is therefore not a critical feature of the broadest aspects of the invention, notwithstanding the fact that for most commercial embodiments a careful attention to geometry is required.

Another aspect of the invention is embodied in an analytical system comprising a lead-germanium telluride laser in combination with an infrared detector in the optical path of the laser, and further including a gas cell or other sample holder between the laser and detector, for spectroscopic detection or quantitative determination of the gases and/or vapors therein having infrared absorption bands that match the wavelength of the laser output. The analysis of solids is also possible.

FIGS. 1, 2, 3 and 4 are greatly enlarged perspective views of a lead-germanium telluride wafer, or portions thereof, during various stages of a preferred process for the fabrication of one embodiment of the laser of the invention;

FIG. 5 is a cross-sectional view of a lead-germanium telluride laser device of the invention;

As shown in FIG. 1, the illustrated process of fabrication begins with a monocrystalline wafer 11 of lead-germanium telluride having p-type conductivity and crystallographically oriented in the <100> direction. The wafer is obtained in accordance with any of the techniques previously known for the growth of mixed monocrystals, such as in the growth of lead-tin telluride for example. Such techniques usually involve the heteroepitaxial growth of the mixed crystal on a substrate seed of monocrystalline lead telluride by vapor phase transport within a sealed quartz ampoule.

A p-n junction 12 is then formed within the crystal by the uniform diffusion of antimony into one surface thereof to form a thin surface layer of n-type conductivity. Suitable conditions for antimony diffusion have been found to include a preliminary flash evaporation of elemental antimony on the crystal surface, followed by heating in a vacuum at a temperature at about 700°C. for 3 to 4 hours.

As shown in FIG. 2, the structure of FIG. 1 is then provided with an etch resistant mask, pattern from a film of KTFR, for example, in accordance with known photolithographic techniques. The wafer is etched with an aqueous solution of HBr and bromine to provide a plurality of parallel "strip mesas." Then, as shown in FIG. 3, the wafer is separated by cleaving along the <100> direction to provide individual strips from which futher cleaving perpendicular to the first cleaving, yields the individual chips shaped in the form of an optical cavity suitable for achieving laser action, as illustrated in FIG. 4. The basic technology required for selective etching and for cleaving is the same as previously known in the handling of related crystals, such as lead telluride. As shown in FIG. 5, each individual chip is then mounted on a TO-18 header and provided with ohmic connections in accordance with known techniques, e.g., a Au-Tl alloy (p-type) and indium (n-type).

Figure 6:
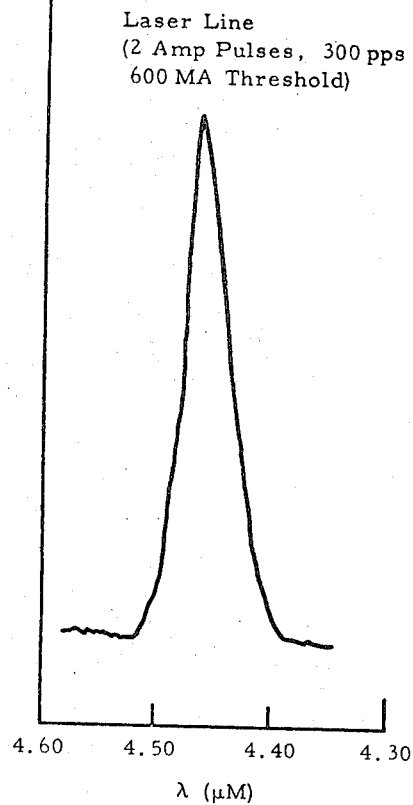
FIG. 6 is a spectrogram of the output of one embodiment of the laser of the invention.

The device of FIG. 5 was then mounted onto the cold finger of a cryogenic dewar flask and cooled to liquid helium temperatures. The dewar was fitted with optical windows and the laser output was focused on the entrance slit of a monochromator. A cooled mercury-cadmium telluride detector was focused on the exit slit of the monochromator. The diode was forward biased by one-microsecond current pulses at a pulse rate of approximately 300 per second. At a threshold of about 600 mA laser emission from the diode was observed. A spectrum of the emitted radiation was obtained using a 300 micron slit on the monochromator, and recorded as shown in FIG. 6. The spectrum of FIG. 6 is specific for a crystal having the composition $Pb_{0.95}$-$Ge_{0.05}Te$. By compositional tuning, a peak emission wavelength of 4.28 $\mu$ is selected for monitoring $CO_2$, 4.63 $\mu$ for CO, and 5.33 $\mu$ for NO.

Figure 7:
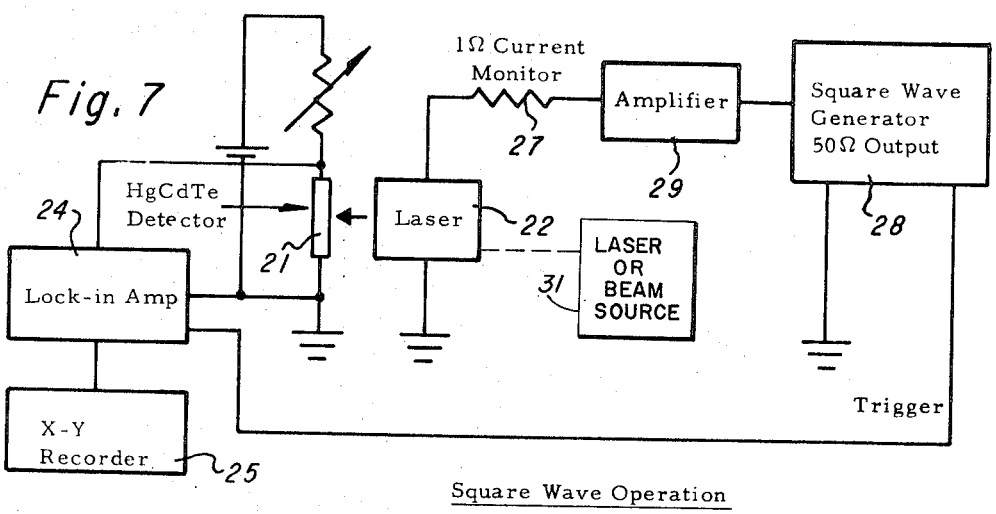
FIG. 7 is a schematic diagram of an embodiment of the spectroscopic system of the invention.

A system for spectroscopic analysis for using the novel laser of the invention is illustrated in FIG. 7. The system includes, for example, a mercury-cadmium telluride detector 21 located in the optical path of laser 22. A gas cell or other sample holder (not shown) is located between the laser and the detector. The detector output is fed to amplifier 24, and the amplifier output is then passed to recorder 25.

The laser is operated by a pulse received from current monitor 27 which in turn is supplied with a suitable pulse from square wave generator 28 and amplifier 29. A trigger pulse is received by the square wave generator from amplifier 24.

A suitable mercury-cadmium telluride infrared detector system is commercially available. Similarly, a system of equipment for pulsing the laser is also commercially available as will be apparent to one skilled in the art. For example, a Tektronics 114 squarewave generator is suitable, in combination with Hewlett-Packard 467A amplifier. Alternatively, the laser 22 may be excited by another laser 31 or other sources of an electron beam.

The system of the invention is useful in the analytical detection and quantitative determination of a wide range of gases and vapors. It is particularly significant that compositional tuning of the laser of the invention permits the selection of any desired peak emission wavelength within the approximate range of 2-6$\mu$, which is particularly suitable in the monitoring of atmospheric gases for nitric oxide, carbon monoxide and carbon dioxide. Other applications include the monitoring of the oxides of nitrogen, and for process control in chemical manufacturing plants.

Although the illustrated embodiment of the laser of the invention employs a semiconductor crysal $Pb_{(1-x)}$-$Ge_xTe$ where $x$ equals 0.05, $x$ values from 0.001 to 0.25 are also within the scope of the invention. Tuning of the output wavelength is achieved by altering the ratio of germanium to lead, and is also achieved by altering the ratio of germanium to lead, and is also achieved to a lesser degree by varying the laser current or temperature, by applying an external magnetic field, and by applying pressure.

What is claimed is:

1. A semiconductor laser comprising a lead-germanium telluride mixed crystal, said crystal including a p-n junction in combination with excitation means for exciting said crystal above the threshold of coherent light emission, said excitation means comprising a source of electric current for biasing said junction above the threshold current density for coherent light emission.

2. A semiconductor laser comprising a lead germanium telluride mixed crystal, in combination with means for exciting said crystal above the threshold of coherent light emission, said excitation means for exciting said crystal including means for generating an electron beam.

3. A semiconductor laser comprising a lead-germanium telluridemixed crystal, in combnationwith means for exciting said crystal above the threshold of coherent light emission, said excitation means for exciting said crystal including a separate laser device for pumping said crystal.

4. A semiconductor diode laser comprising a mixed crystal mono-crystalline body of lead-germanium telluride having a p-n junction therein, said body including opposite, parallel, optically flat surfaces perpendicular to a substantial portion of said junction.

5. A laser as defined by claim 4, wherein said body includes a p-type substrate, a shallow n-type surface layer, and an ohmic contact to each of said substrate and said surface layer.

6. A laser as defined by claim 5, further including means for exciting said junction to cause the stimulated emission of coherent light.

* * * * *